May 28, 1957 G. E. WITTE 2,793,428
METHOD OF JOINING AND SEALING PIPE SECTIONS
Filed Feb. 1, 1954
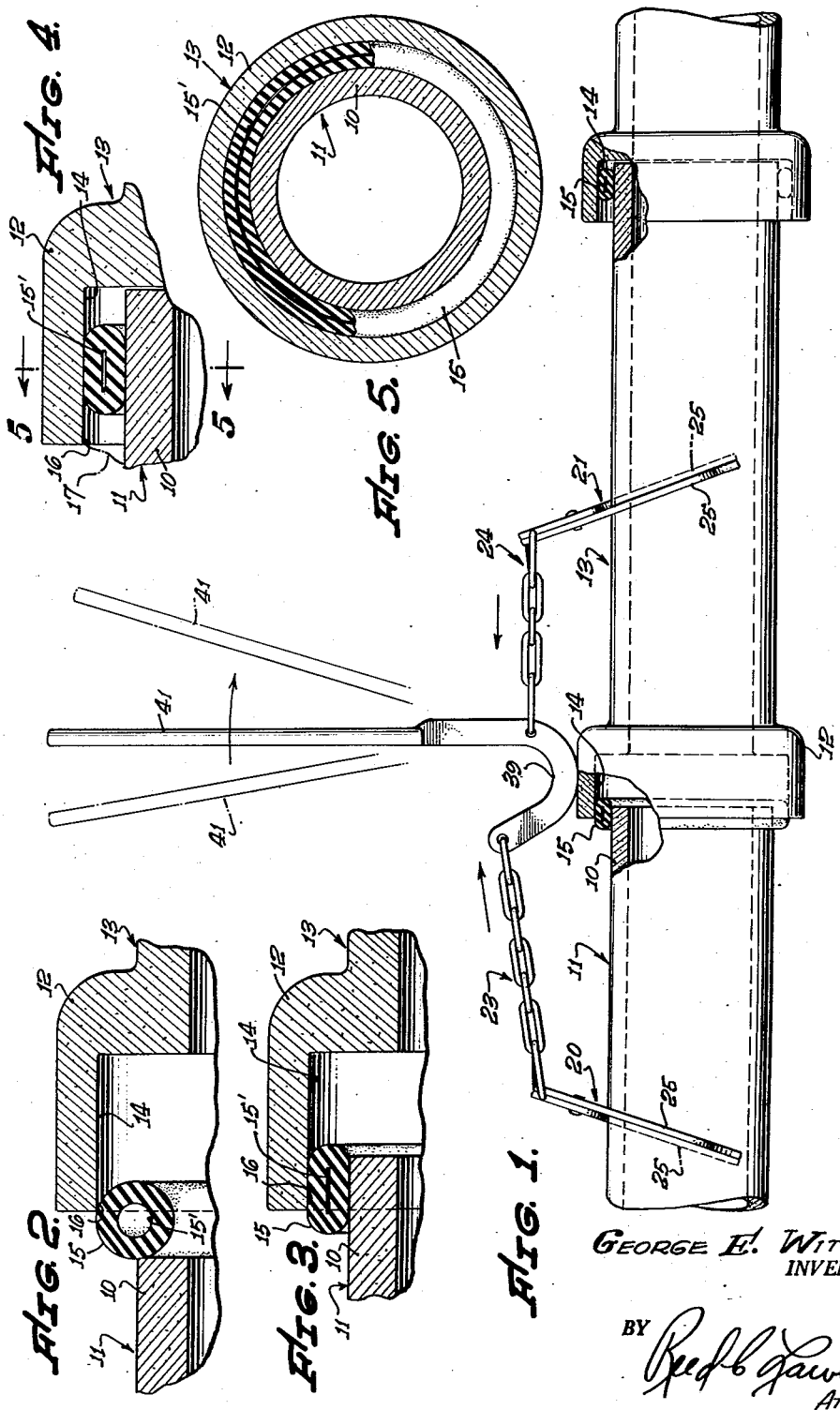
GEORGE E. WITTE,
INVENTOR.
BY
ATTORNEY.

United States Patent Office 2,793,428
Patented May 28, 1957

2,793,428

METHOD OF JOINING AND SEALING PIPE SECTIONS

George E. Witte, North Hollywood, Calif.

Application February 1, 1954, Serial No. 407,491

3 Claims. (Cl. 29—451)

This invention relates generally to conduits and more particularly to a method of and means for connecting and sealing drain pipe or sewer pipe sections. Specifically, the invention is concerned with joining and sealing the bell-and-spigot ends of adjoining pipe sections of a pipe line.

Vitrified clay pipe sections of the common bell-and-spigot type are of simple configuration, the outer surface of the spigot and the inner surface of the bell being of cylindrical configuration free of any large grooves or steps. Such bell-and-spigot pipe sections are commonly joined in axial alignment by inserting the spigot end of one section into the bell end of the other section and applying cement mortar compound in the annular space occuring between the inside of the bell and the periphery of the spigot, the mortar hardening in place to retain the ends of the pipe sections in connected relation.

The present concept contemplates a novel and ingenious method for connecting and sealing the adjoining bell-and-spigot ends of adjacent pipe sections of a drain or sewer pipe line by means of a resilient ring seal.

Another object of the invention is to provide a method for connecting and sealing such bell-and-spigot pipe sections by means of a resilient ring which fits tightly within the annular space occurring between the spigot end of one pipe section and the inner surface of the bell of the other pipe section, said ring being compressed therebetween and providing a positive leak-proof joint.

Another object of the invention is to provide a method of connecting and sealing the bell-and-spigot ends of such drain and sewer pipe sections which may be carried out expeditiously and with little effort so that several pipe sections may be joined in a small fraction of the time usually required when the sections are joined by the method commonly employed.

Further objects of the invention will appear from the following description and from the drawing, which is intended to illustrate the improved means for connecting and sealing the adjoining bell-and-spigot ends of pipe sections and the method employed for effecting such coupling and sealing, and in which:

Fig. 1 is a side view of the adjoining bell-and-spigot ends of two pipe sections, illustrating the sealing produced in carrying out the present method of joining the pipe sections;

Figs. 2, 3 and 4 are fragmentary longitudinal sectional views of the adjoining bell-and-spigot ends of the pipe sections and illustrating the manner in which the spigot end and the sealing element are inserted into the bell to connect the pipe sections and provide a leak-proof seal; and Fig. 5 is a cross-sectional view, taken on line 5—5 of Fig. 4.

Referring first to Fig. 1, the present invention is concerned with a method of connecting the spigot end 10 of a common drain or sewer pipe section 11 to the bell end 12 of another common pipe section 13. The pipe sections 11 and 13 may be of the vitrified clay type. As is usual in such pipe sections, the inside diameter of the bell 12 is considerably larger than the outside diameter of the spigot 10, which is inserted therein, so that there exists an annular space 14 therebteween. In the usual practice, the spigot is retained within the bell through the medium of a cement mortar compound which is introduced into the annular space to cement the bell and spigot ends together with the pipe sections in axial alignment. Considerable difficulty is experienced in maintaining the sections coaxial during the time in which the mortar compound is allowed to set and harden in place, and it is apparent that if the sections shift transversely relative to each other, shoulders or "feathers" may occur at the bell-and-spigot joints to impede the proper flow of water and other matter through the pipe line. As previously indicated, the present invention obviates this difficulty by providing a method of connecting and sealing the bell and spigot ends of adjacent pipe sections in a manner such that the placing and hardening of mortar or other plastic sealing material in the annular sealing space is unnecessary or at least, if used, produces no "feather."

The method for effecting this highly desirable result makes use of a sealing element 15 which consists of a ring constructed from rubber or other resilient, water-impervious material. As shown in Fig. 2, the sealing ring 15 is circular in cross-section and has a central, circular bore 15' so that the ring is tubular throughout. Due to its resiliency, the ring is adapted to be compressed to deform its normally circular contour to a relatively flat shape in the manner and for the purpose to be presently explained. It is to be noted by reference to Fig. 2 that the outside diameter of the sealing ring 15 is slightly larger than the inside diameter of the bell 12, and that the inside diameter of the ring is considerably smaller than the outside diameter of the spigot end 10.

To connect the pipe sections 11 and 13 in axial alignment, with the spigot 10 within the bell 12, the connecting and sealing element 15 is first placed against the outer, annular end or mouth 16 of the bell as illustrated in Fig. 2. The pipe section 11, which is to be joined to the pipe section 13, is next so placed that the end of its spigot 10 engages the outer side of the sealing ring 15 with the three parts 10, 15 and 12 substantially axially aligned.

The pipe section 11 is next forced axially toward the pipe section 13. During this movement, the end of the spigot 10 compresses and distorts the sealing ring 15 against the mouth 16 and as relative axial movement between the spigot end and the sealing ring is continued, the spigot end is forced into the sealing ring which expands circumferentially to allow such movement. Thus, the cross section of the ring 15 is changed from a circular shape to the flat contour shown in Figs. 3 and 4.

With the sealing ring 15 simultaneously flattened and rolled onto the spigot end 10, further inward movement of the spigot end into the bell 12 causes this end to enter the ring. It is, of course, important that the sealing ring 15 be of the appropriate inside and outside diameters, that it have the effective cross-sectional area which will permit its distortion to a flat contour of a thickness to fit tightly between the bell and spigot, and that it be constructed from a highly resilient material.

Comparing the relation of the parts 10, 15 and 12 in Figs. 3 and 4, it will be observed that as the spigot end 10 moves into the bell 12, the ring 15, in effect, rolls past the end edges of both the bell and the spigot and inwardly into the bell and outwardly from the end of the spigot so that when the spigot reaches the limit of its inward movement with its end disposed at the inner surface of the bell, the ring 15 is located axially outwardly of the end of the spigot and axially inwardly of the bell and intermediate the inner and outer ends of the annular space 14.

The resilient ring 15, being wedged tightly between the bell 12 and spigot 10, provides a positive leak-proof seal and at the same time effectively resists both relative axial movement and relative longitudinal movement between the pipe sections 11 and 13. If desired, the connecting and sealing ring 15 may be protected by a suitable caulking compound or mortar applied as indicated at 17 in Fig. 4. The seal prevents this compound from flowing past the inward end of the spigot and into the space within the pipes where it might form "feathers."

By practicing the present method, the pipe sections are connected and sealed by the resilient sealing ring so that the pipe line may be used immediately following such coupling of its sections.

It will be apparent from the foregoing that considerable axial force is necessary to insert the spigot end 10 and sealing element 15 into the bell 12, due to the frictional resistance encountered. While the bell and spigot ends may be forced together manually, this is very difficult. For this reason I have provided a tool which effects the mechanical advantage necessary to accomplish the desired result with minimum effort on the part of the operator.

The tool or device that I prefer to employ in my method is fully disclosed and claimed in my patent application, Serial No. 407,410, filed February 1, 1954, and entitled Tool for Assembling and Sealing Adjoining Drain Pipe Sections, reference being made to the application for a comprehensive description of the device. Suffice to state herein that the tool consists of a pair of gripping elements 20 and 21, each having pivoted, curved jaws 25 which cross each other. The upper, free ends of the jaws are operatively joined by chain means 23 and 24, which are connected to opposite sides of the lower, curved fulcrum end 39 of an operating lever 22 which has a handle portion 41 by which the lever can be rocked on its fulcrum.

With the gripping elements 20, 21 engaged with the respective pipe sections 11 and 13 the linkages 23, 24 taut, and the fulcrum 39 resting against the section 13, the handle 41 is pivoted as indicated by the arrow in Fig. 1. This action causes the gripping elements 20 and 21 to be drawn toward each other so as to force the spigot end 10 of the pipe section 11 and the sealing ring 15 into the bell 12 of the other section 13 to couple the sections and seal the bell-and-spigot joint.

The forces applied by the tongs to the adjacent pipe sections are equal and opposite and thus serve to prevent the application of forces to joints already formed. This feature minimizes the possibility of causing any misalignment of previously coupled sections.

While only one way of applying the invention has been described above in detail, it will be understood that the invention is not limited thereto but may be applied in other ways within the scope of the appended claims.

The invention claimed is:

1. A method of joining and sealing the adjacent bell and spigot ends of pipe sections by means of an annular, resilient, tubular joining and sealing element of normally circular cross-sectional shape, each of said pipe sections having an annular end surface, said element having an outside diameter greater than the inside diameter of the bell and an inside diameter less than the outside diameter of the spigot, which comprises the steps of: placing the joining and sealing element between the mouth of the bell of one pipe section and the spigot end of another pipe section with spaced portions of said sealing element being initially in substantially unstressed contact with the annular end surfaces of both said pipe sections, initially applying opposite axial contracting forces against said pipe sections to force said spigot into said bell through said element thereby to cause the outside diameter of said element to be compressed past the annular end surface of said bell to the interior of said bell, and to cause the inside diameter of said element to be expanded over the annular end surface of said spigot onto said spigot, whereby said element is collapsed to a relatively flat cross-sectional shape compressed between the concentric surfaces of the bell and spigot, and continuing application of said opposite contracting forces to cause the said sealing element to roll axially outwardly of the spigot and into the bell as said pipe sections are forced toward one another thereby to locate the element axially outwardly from the end of the spigot and axially inwardly from the mouth of the bell.

2. The method of joining and sealing the adjacent bell and spigot ends of pipe sections, each of said pipe sections having an annular end surface, consisting in the steps of: providing an annular, resilient, tubular joining and sealing element of normally circular cross-sectional shape, said element having an outside diameter greater than the inside diameter of the bell and an inside diameter less than the outside diameter of the spigot, placing the joining and sealing element coaxially between the mouth of the bell of a pipe section and the spigot end of another pipe section with spaced circular external surface portions of said sealing element being initially in substantially unstressed contact with the annular end surfaces of said pipe sections, and applying opposite axial contracting forces against said pipe sections to force said spigot into said bell through said element to cause the latter to expand resiliently over the annular end surface of said spigot onto said spigot and to be resiliently collapsed to a relatively flat cross-sectional shape compressed between the concentric surfaces of the bell and spigot and to cause the element to roll axially outwardly of the spigot and into the bell so as to locate the element axially outwardly from the end of the spigot and axially inwardly from the mouth of the bell.

3. The method of claim 2 including the further step of applying a caulking compound in the annular space between the said bell and spigot outwardly of the said sealing element.

References Cited in the file of this patent

UNITED STATES PATENTS

| 2,032,492 | Nathan | Mar. 3, 1936 |
| 2,138,946 | Trickey | Dec. 6, 1938 |
| 2,272,115 | Halkyard | Feb. 3, 1942 |
| 2,329,000 | Rembert | Sept. 7, 1943 |
| 2,379,508 | Dodge | July 3, 1945 |